(12) United States Patent
Shearer et al.

(10) Patent No.: US 12,359,411 B2
(45) Date of Patent: Jul. 15, 2025

(54) AUTOMATIC DRAIN SYSTEM

(71) Applicant: B/E AEROSPACE, INC., Winston Salem, NC (US)

(72) Inventors: Jon Shearer, Hartville, OH (US); Eric Kaufman, Uniontown, OH (US); Alexander V. Drum, Akron, OH (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/410,749

(22) Filed: Jan. 11, 2024

(65) Prior Publication Data

US 2024/0141633 A1    May 2, 2024

Related U.S. Application Data

(62) Division of application No. 17/576,438, filed on Jan. 14, 2022, now Pat. No. 11,905,693.

(51) Int. Cl.
| | | |
|---|---|---|
| *E03C 1/182* | (2006.01) | |
| *B64D 11/04* | (2006.01) | |
| *E03C 1/23* | (2006.01) | |
| *E03C 1/242* | (2006.01) | |

(52) U.S. Cl.
CPC .............. *E03C 1/182* (2013.01); *B64D 11/04* (2013.01); *E03C 1/242* (2013.01); *E03C 2001/2311* (2013.01)

(58) Field of Classification Search
CPC .. E03C 1/182; E03C 1/242; E03C 2001/2311; B64D 11/04
USPC ................. 4/516, 515, 517, 519, 520, 518
See application file for complete search history.

(56) References Cited

U.S. PATENT DOCUMENTS

| | | | | |
|---|---|---|---|---|
| 6,308,351 | B1 * | 10/2001 | Franke ...................... | E03C 1/23 4/689 |
| 6,763,533 | B2 * | 7/2004 | Mayer ...................... | E03C 1/22 4/619 |
| 9,157,220 | B2 * | 10/2015 | Ball .......................... | E03C 1/22 |
| 10,221,548 | B2 * | 3/2019 | Stachowski ............... | E03C 1/23 |
| 10,266,268 | B2 * | 4/2019 | Boodaghians .......... | E03C 1/182 |
| 2003/0213063 | A1 * | 11/2003 | Mayer ...................... | E03C 1/22 4/679 |
| 2012/0151670 | A1 * | 6/2012 | Aykens ................... | E03C 1/048 4/619 |

(Continued)

FOREIGN PATENT DOCUMENTS

| | | |
|---|---|---|
| CN | 104264740 | 2/2016 |
| CN | 107882132 | 4/2018 |

(Continued)

OTHER PUBLICATIONS

European Patent Office; European Search Report dated May 9, 2023 in Application No. 231517766.5.

(Continued)

*Primary Examiner* — Lori L Baker
(74) *Attorney, Agent, or Firm* — SNELL & WILMER L.L.P.

(57) ABSTRACT

An automatic drain system may comprise a drain including a neck defining a drain orifice and a flange extending from the neck. A liquid detection sensor is located on at least one of the neck or the flange. A sink assembly may comprise a sink basin and the drain located in a sink opening formed in the sink basin.

7 Claims, 6 Drawing Sheets

(56) References Cited

U.S. PATENT DOCUMENTS

| | | | | |
|---|---|---|---|---|
| 2013/0340163 A1* | 12/2013 | Ball | ......................... | E03C 1/22 |
| | | | | 4/679 |
| 2017/0297718 A1* | 10/2017 | Boodaghians | ......... | B64D 11/02 |
| 2018/0187401 A1* | 7/2018 | Chong | .................... | E03C 1/182 |

FOREIGN PATENT DOCUMENTS

| | | | | | |
|---|---|---|---|---|---|
| CN | 107882132 A | * | 4/2018 | ............ | E03C 1/182 |
| CN | 112374671 | | 2/2021 | | |
| EP | 2281955 | | 2/2011 | | |
| EP | 2281955 A1 | * | 2/2011 | ........... | E03C 1/2306 |
| EP | 2947213 | | 11/2015 | | |
| EP | 2918739 | | 9/2018 | | |
| EP | 3670768 | | 6/2020 | | |
| EP | 3670768 A1 | * | 6/2020 | .............. | E03C 1/12 |
| GB | 2533764 | | 7/2016 | | |
| GB | 2533764 A | * | 7/2016 | .............. | A47K 1/14 |
| JP | 2004324061 | | 11/2004 | | |
| KR | 20150109085 | | 10/2015 | | |

OTHER PUBLICATIONS

USPTO; Notice of Allowance dated Oct. 18, 2023 in U.S. Appl. No. 17/576,438.
USPTO; Notice of Allowance dated Sep. 13, 2023 in U.S. Appl. No. 17/576,438.
USPTO; Non-Final Office Action dated Jun. 12, 2023 in U.S. Appl. No. 17/576,438.
USPTO; Response to Election / Restriction dated Mar. 14, 2023 in U.S. Appl. No. 17/576,438.

* cited by examiner

AUTOMATIC DRAIN SYSTEM

CROSS-REFERENCE TO RELATED APPLICATIONS

This application is a divisional of, and claims priority to and the benefit of, U.S. patent application Ser. No. 17/576,438, filed Jan. 14, 2022, entitled "AUTOMATIC DRAIN SYSTEM," which is hereby incorporated by reference in its entirety for all purposes.

FIELD

The present disclosure relates to drain systems and, in particular, to automatic drain systems for aircraft.

BACKGROUND

Aircraft galley and lavatory sink assemblies generally include a faucet, which provides potable water, and a sink basin into which the potable water output by the faucet and other liquids may be poured. A drain system is fluidly coupled between the sink basin and a greywater tank. The drain system typically includes a drain located in the sink basin, one or more conduits (e.g., drain lines or hoses) fluidly coupling the drain to a greywater tank, a motorized valve configured to control the flow of fluid from the drain to the greywater tank, and sensor(s) located in the conduits between the drain and the motorized valve. The system is configured such that the motorized valve actuates to an open position in response to the sensor(s) detecting water in the conduits, thereby allowing the liquid to flow into the greywater tank. When the valve is in the closed position, the liquid remains between the valve and the sink basin. The sensors are prone to corrosion and build-up (e.g., sludge), which can lead to false positives (e.g., the sensor outputting a water present signal, when there is no water in the conduit) and/or failing to detect water. The valve remaining open can impact cabin pressure and poses a flight risk. Similarly, a valve failing to open can lead to liquid backup and/or overflow in sink basin. Also, the location of the sensors within the conduits makes accessing the sensors for cleaning or other maintenance difficult.

SUMMARY

An automatic drain system is disclosed herein. In accordance with various embodiments, the automatic drain system may comprise a drain including a neck defining a drain orifice and a flange extending from the neck, and a liquid detection sensor located on at least one of the neck or the flange.

In various embodiments, the liquid detection sensor may comprise a first conductor electrically coupled to a positive terminal and a second conductor electrically isolated from the first conductor and electrically coupled to a negative terminal.

In various embodiments, a valve may be downstream of the drain and an electromechanical actuator may be configured to translate the valve between an open position and closed position.

In various embodiments, at least one of a screen or a plug may be located between the flange and a distal end of the neck. In various embodiments, at least one of the first conductor or the second conductor may be located between the flange and the at least one of the screen or the plug.

In various embodiments, the first conductor may have an annular shape. In various embodiments, the second conductor may be located radially between the first conductor and the drain orifice. In various embodiments, an indicator light may be located radially between the first conductor and the second conductor.

A sink assembly is also disclosed herein. In accordance with various embodiments, the sink assembly may comprise a sink basin and a drain located in a sink opening formed in the sink basin. The drain may include a neck and a flange extending from the neck. An internal surface of the neck defines a drain orifice. The sink assembly further comprises a liquid detection sensor located on at least one of the neck or the flange.

In various embodiments, the liquid detection sensor may comprise a first conductor electrically coupled to a positive terminal and a second conductor electrically isolated from the first conductor and electrically coupled to a negative terminal.

In various embodiments, a controller may be operably coupled to the liquid detection sensor. The positive terminal may be part of a first portion of a circuit located in the controller, and the negative terminal may be part of a second portion of the circuit. The controller may be configured to detect whether current is flowing through the circuit.

In various embodiments, a valve may be downstream of the drain and an electromechanical actuator may be configured to translate the valve between an open position and closed position. In various embodiments, the controller may be configured to command the electromechanical actuator to actuate the valve to the open position in response to detecting current is flowing through the circuit. The controller may be configured to command the electromechanical actuator to actuate the valve to the closed position in response to detecting current is not flowing through the circuit.

In various embodiments, a faucet may be configured to output a liquid into the sink basin. The controller may be communication with the faucet and may be configured to determine a fault condition exists in response to determining that the faucet is outputting the liquid and that current is not flowing through the circuit.

In various embodiments, the drain may include at least one of a screen or a plug located between the flange and a distal end of the neck. The liquid detection sensor may be located between the flange and the at least one of the screen or the plug. In various embodiments, the liquid detection sensor may be located on the neck and 6.0 inches or less from the flange.

An article of manufacture including a tangible, non-transitory computer-readable storage medium having instructions stored thereon for controlling an automatic drain system is also disclosed herein. In accordance with various embodiments, the instructions, in response to execution by a controller, cause the controller to perform operations, which may comprise receiving, by the controller, a signal from a liquid detection sensor located on a flange of a drain of the automatic drain system; determining, by the controller, whether a valve should be in an open position or a closed position based on the signal output by the liquid detection sensor; and commanding, by the controller, an electromechanical actuator to actuate the valve to at least one of the open position or the closed position.

In various embodiments, determining, by the controller, whether the valve should be in the open position or the closed position based on the signal output by the liquid detection sensor comprises detecting, by the controller, whether current is flowing between a first portion of a circuit and a second portion of the circuit.

In various embodiments, the operations may further comprise starting, by the controller, a timer in response to detecting current is flowing between the first portion of the circuit and the second portion of the circuit; and commanding, by the controller, an alert system to output an alert in response to the timer exceeding a threshold time limit.

In various embodiments, the operations may further comprise receiving, by the controller, a signal from a faucet indicating water is being output by the faucet; and commanding, by the controller, an alert system to output an alert in response to determining water is being output by the faucet and current is not flowing between the first portion of the circuit and the second portion of the circuit.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

Disclosed herein, according to various embodiments, is an automatic drain system. In accordance with various embodiments, liquid detection sensors are located on the drain proximate the sink basin. Locating the liquid detection sensor on the drain allows the sensors to be easily accessed for cleaning, which tends to reduce, or prevent, corrosion buildup on the sensors. Although details and examples are included herein pertain to implementing the automated drain assembly in an aircraft galley, the present disclosure is not necessarily so limited. For example, the automated drain system may be employed in aircraft lavatories and/or in other vehicles (e.g., ships, trains, recreation vehicles, etc.). Thus, aspects of the disclosed embodiments may be adapted for performance in a variety of other industries. As such, numerous applications of the present disclosure may be realized.

Figure 1:
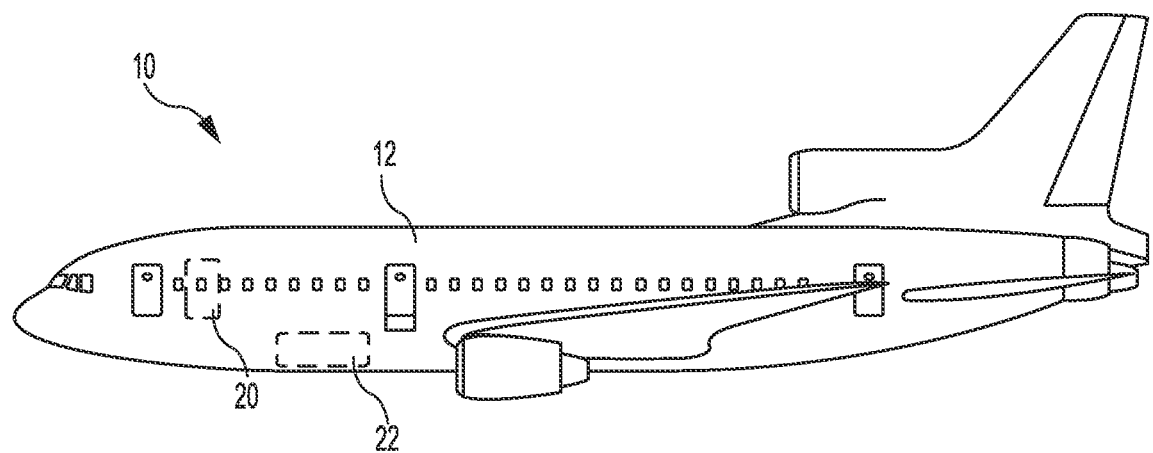
FIG. 1 illustrates an aircraft, in accordance with various embodiments.

Referring now to FIG. 1, an aircraft 10 having a fuselage 12 is illustrated, in accordance with various embodiments. Fuselage 12 defines an aircraft cabin therein. In this regard, passengers may board the aircraft 10 and sit within the aircraft cabin during travel. The aircraft cabin includes at least one galley 20. Aircraft 10 may have a potable water source 22 that supplies potable water to a galley 20.

Figure 2:
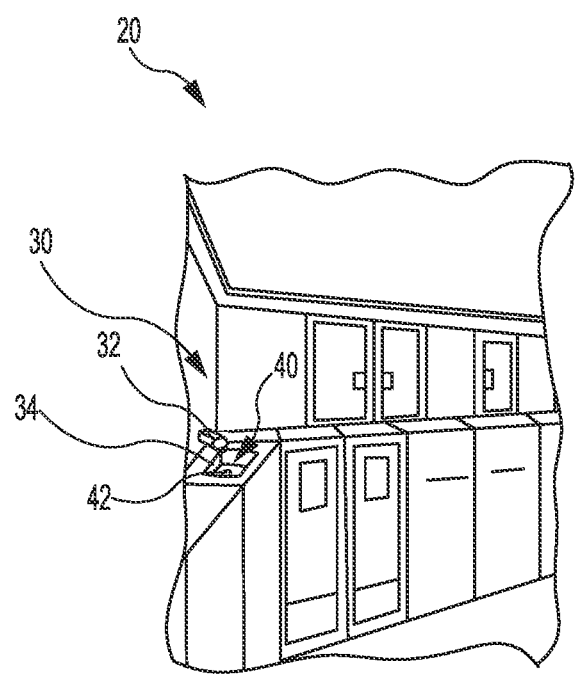
FIG. 2 illustrates an aircraft galley, in accordance with various embodiments.

With reference to FIG. 2, a portion of galley 20 is illustrated. In accordance with various embodiments, a sink assembly 30 may be installed in galley 20. Sink assembly 30 includes a faucet 32 and a sink basin 34 configured to receive water output by faucet 32. Faucet 32 may receive water from potable water source 22 (FIG. 1). In accordance with various embodiments, sink assembly 30 includes an automatic drain system 40. A drain 42 of automatic drain system 40 may be installed in sink basin 34. Water or other liquid exits sink basin 34 through drain 42 (e.g., fluid flows out sink basin 34 via drain 42).

Figure 3:
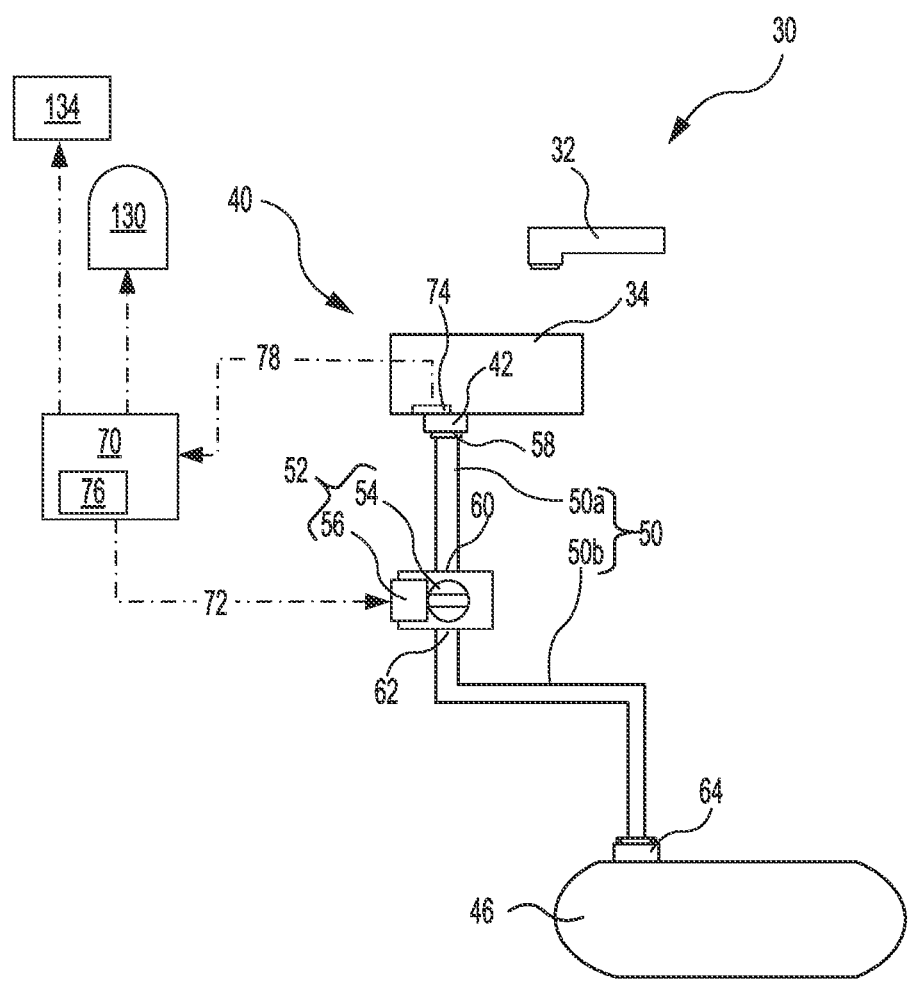
FIG. 3 illustrates a schematic of a sink assembly, in accordance with various embodiments.

With additional reference to FIG. 3, a schematic of sink assembly 30 is illustrated. In accordance with various embodiments, water, or other liquid waste, deposited in sink basin 34 may be deposited into greywater tank 46 via one or more conduits 50. In accordance with various embodiments, automatic drain system 40 is located between sink basin 34 and greywater tank 46. Automatic drain system 40 includes drain 42 and a motorized valve assembly 52. Motorized valve assembly 52 includes a valve 54 and an electromechanical actuator 56 configured to actuate valve 54 between a closed position and an open position. In the closed position, valve 54 blocks, or otherwise prevents, the flow of fluid from drain 42 to greywater tank 46. When valve 54 is in the open position, fluid may flow from drain 42 into greywater tank 46.

In accordance with various embodiments, valve 54 is located fluidly between drain 42 and greywater tank 46. A first conduit 50a (or plurality of first conduits) may be coupled to an outlet 58 of drain 42 and an inlet 60 of valve 54. A second conduit 50b (or plurality of second conduits) is coupled to an outlet 62 of valve 54 and an inlet 64 of greywater tank 46.

A controller 70 (shown schematically) of automatic drain system 40 is operably coupled to and is in communication with motorized valve assembly 52. Controller 70 is configured to control actuation of valve 54. In this regard, controller 70 sends commands 72 (e.g., outputs electrical signals) to electromechanical actuator 56. The commands are configured to cause to electromechanical actuator 56 to actuate valve 54 to either the open position or the closed position.

Controller 70 is also in communication with a liquid detection sensor 74 located on drain 42. Controller may also be in communication with an aircraft alert system 134 to alert crew or maintenance personnel of a fault condition or other issue with drain 42. Controller 70 may include a general-purpose processor, a digital signal processor (DSP), an application specific integrated circuit (ASIC), a field programmable gate array (FPGA), or some other programmable logic device, discrete gate or transistor logic, discrete hardware components, or any combination thereof. A tangible, non-transitory computer-readable storage medium is in communication with controller 70. The storage medium 76 may comprise any tangible, non-transitory computer-readable storage medium known in the art. The storage medium 76 has instructions stored thereon that, in response to execution by controller 70 cause controller 70 to perform operations related to controlling the flow of liquid through automatic drain system 40.

Controller 70 is configured to determine whether liquid is present in sink basin 34 based on signal(s) 78 received from liquid detection sensor 74. In response to determining liquid is present in sink basin 34, controller 70 commands electromechanical actuator 56 to actuate valve 54 to the open position, thereby allowing liquid in first conduit 50a to flow into greywater tank 46. In response to determining liquid is not present in sink basin 34, controller 70 commands electromechanical actuator 56 to actuate valve 54 to the closed position.

Figure 4A:
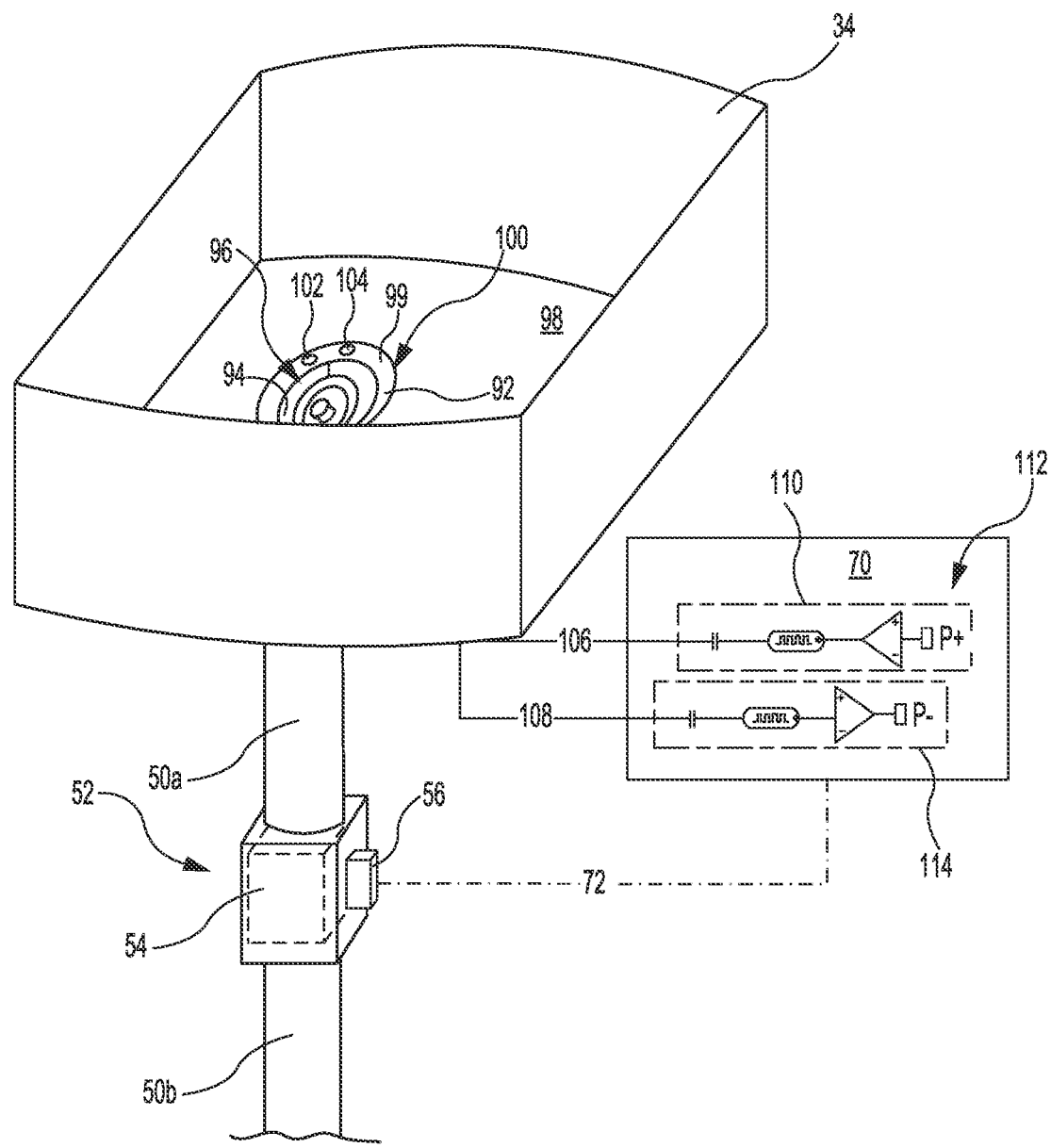
FIG. 4A illustrates a perspective view of a sink basin within an automatic drain system, in accordance with various embodiments.
Figure 4B:
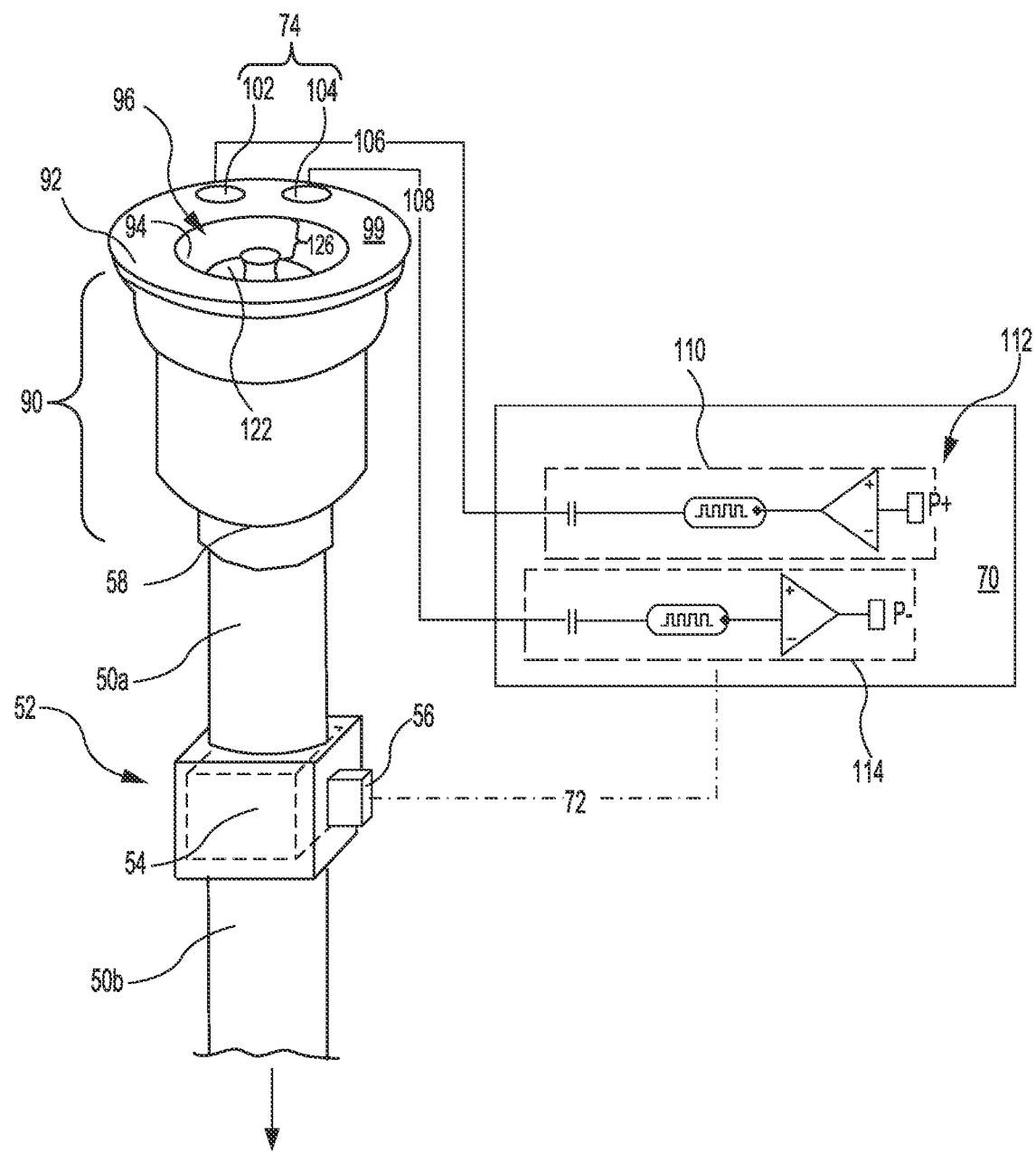
FIG. 4B illustrates a perspective view of an automatic drain system, in accordance with various embodiments.

FIG. 4A shows a perspective view of drain 42 located in sink basin 34. FIG. 4B shows a perspective view of drain 42 with sink basin 34 removed for clarity. With combined reference to FIGS. 4A and 4B, drain 42 includes a neck 90 and a flange 92. Neck 90 has a generally cylindrical shape and may be coaxial with the first conduit 50a connected to outlet 58 of drain 42. An internal surface 94 of neck 90 defines the drain orifice 96 through which the liquid from sink basin 34 enters drain 42. Flange 92 extends radially outward from neck 90. Flange 92 may extend 360° about neck 90. In various embodiments, flange 92 extends over at least a portion of surface 98 of sink basin 34. Sink opening 100 may be formed through and defined by surface 98. In various embodiments, surface 99 of flange 92 is coplanar and/or even with surface 98 of sink basin 34.

In various embodiments, liquid detection sensor 74 includes a first conductor 102 and a second conductor 104. First conductor 102 and second conductor 104 are each made out of an electrically conductive material, for example, out of a metal or a metal alloy. Second conductor 104 is electrically isolated from first conductor 102. In this regard, flange 92 of drain 42 may be made of an electrically isolating material and/or an electrically insulating material may be located between each of first and second conductors 102, 104 and flange 92. Liquid detection sensor 74 may be configured to prevent, or reduce, corrosion by avoiding electrolysis on the sensor contacts (e.g., the first and second conductors 102, 104). An alternating current signal, which may be devoid of a direct current bias, is provided to the first conductor 102 and second conductor 104 by controller 70.

First conductor 102 is electrically connected to a positive terminal P+ via a conductive link (e.g. wire) 106. Second conductor 104 is electrically connected to a negative terminal P− via a conductive link (e.g., wire) 108. In various embodiments, positive terminal P+ may be part of a first portion 110 of a circuit 112 located in controller 70. Negative terminal P− may be part of a second portion 114 of circuit 112. First and second conductors 102, 104 are configured such that no current flows between first conductor 102 and second conductor 104 and/or between first portion 110 and second portion 114 of circuit 112 unless a conductive liquid (e.g., water having dissolved ions) is in contact with both first conductor 102 and second conductor 104. Stated differently, current does not flow between first conductor 102 and second conductor 104 and/or between first portion 110 and second portion 114 of circuit 112 unless an electrical connected is formed between first conductor 102 and second conductor 104. In this regard, the presence of liquid in sink basin 34 creates a conductive link (e.g., an electrical connection) between first conductor 102 and second conductor 104, thereby causing current to flow from positive terminal P+ and first portion 110 of circuit 112 to negative terminal P− and second portion 114 of circuit 112. Controller 70 is configured to detect a flow of current through circuit 112 and, in response to detecting current flowing through circuit 112, command electromechanical actuator 56 to actuate valve 54 to the open position. With valve 54 in the open position, the fluid in conduit 50a can flow to greywater tank 46, thereby draining sink basin 34. The liquid emptying from sink basin 34 removes the electrical connection between first conductor 102 and second conductor 104 thereby causing the current flow through circuit 112 to cease, in response to detecting that current is not flowing through circuit 112, controller 70 commands electromechanical actuator 56 to actuate valve 54 to the closed position.

In various embodiments, liquid detection sensor 74 is located on flange 92. In this regard, first and second conductors 102, 104 are located on flange 92 and outside the drain orifice 96. Locating liquid detection sensor 74 on flange 92 allows liquid detection sensor 74 to be easily wiped down and cleaned, which tends to reduce, or prevent, corrosion buildup on liquid detection sensor 74.

Figure 5:
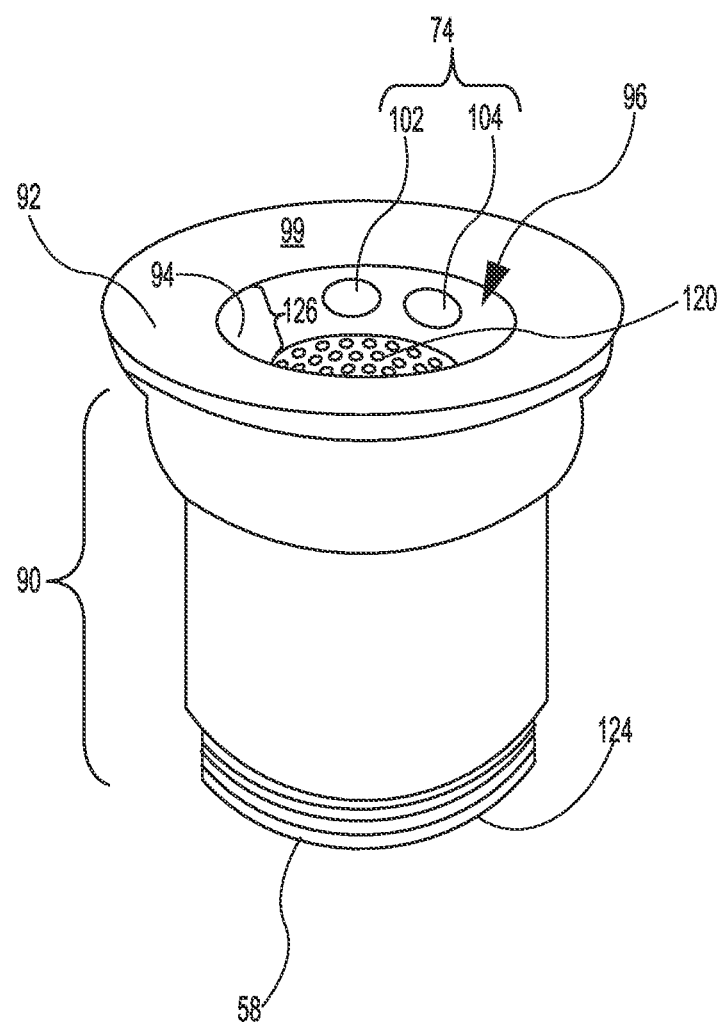
FIG. 5 illustrates a drain for an automatic drain system, in accordance with various embodiments.

In various embodiments, liquid detection sensor 74 may be located on internal surface 94 of neck 90, FIG. 5 illustrates a perspective view of drain 42 with first and second conductors 102, 104 located on internal surface 94 of neck 90. First and second conductors 102, 104 are located in drain orifice 96 and below surface 99 of flange 92, but within reach of a person wiping down sink basin 34 (FIG. 4A). For example, first and second conductors 102, 104 may be located 6.0 inches (15.2 cm) or less from surface 99 of flange 92. In various embodiments, first and second conductors 102, 104 may be located 3.0 inches (7.6 cm) or less from surface 99 of flange 92. In various embodiments, first and second conductors 102, 104 may be located 1.0 inches (2.5 cm) or less from surface 99 of flange 92.

In various embodiments, a screen 120 or a plug 122 (FIG. 4B) may be located in neck 90. The screen 120 (or plug 122) may connect to neck 90 below flange 92. Stated differently, screen 120 (or plug 122) is located between flange 92 and a distal end 124 of neck 90. Distal end 124 is opposite flange 92. In various embodiments, distal end 124 defines outlet 58. In various embodiments, an external (i.e., outer circumferential) surface of neck 90 may be threaded at distal end 124. In various embodiments, internal surface 94 of neck 90 may be threaded at distal end 124. A portion 126 of internal surface 94 of neck 90 extends between screen 120 and surface 99 of flange 92 (and/or between the plug 122 (FIG. 4:13) and surface 99). In various embodiments, first conductor 102 and second conductor 104 are located on portion 126 of internal surface 94. In various embodiments, one of first conductor 102 and second conductor 104 is located on flange 92 and the other of first conductor 102 and second conductor 104 is located on portion 126 of internal surface 94.

Returning to FIG. 3, in various embodiments, automatic drain system 40 may include an indicator light 130. Indicator light 130 may be located on sink assembly 30 (e.g., on sink basin 34 or faucet 32) or in another location in galley 20 (FIG. 2). Controller 70 is in communication with and may control various functions of indicator light 130. For example, controller 70 be configured to command indicator light 130 to power ON (i.e., output light) when valve 54 is in the open position and to power OFF when valve 54 is in the closed position. In various embodiments, controller 70 may command indicator light 130 to flash (e.g., switch between a powered OFF state and a powered ON state) when valve 54 is in the open position.

In various embodiments, controller 70 may be configured to detect a fault condition within automatic drain system 40. Controller 70 may command indicator light 130 to output a first color (e.g., white or green) during normal operating conditions and to output a second color (e.g., red) and/or to flash in response to detecting a fault condition. In various embodiments, controller 70 may detect a fault condition by determining whether valve 54 has been open for longer than a threshold time, limit. For example, controller 70 may start a timer in response to detecting current flow in circuit 112 (FIG. 4A). Controller 70 stops the timer each time the current flow through circuit 112 ceases and starts the timer again from zero each time current is detected. Controller 70 commands indicator light 130 to output an alert (e.g., flash red), in response to the timer exceeding the threshold time limit (e.g., 5 minutes, 10 minutes, or any other desired time limit). Controller 70 may also be configured to command an alert system 134 to output an alert to flight crew in response to the timer exceeding the threshold time limit.

In various embodiments, controller 70 may be in communication with faucet 32. Controller 70 may determine a fault condition exists if faucet 32 is outputting water, but current is not flowing through circuit 112. In response to determining there is a fault condition, controller may command alert system 134 to output an alert configured to convey to flight crew and/or other maintenance personnel that liquid detection sensor 74 is not working properly and may be in need of cleaning and/or replacement. The alert can also help prevent sink overflow, by alerting flight crew that the sink basin 34 is not draining (e.g., that valve 54 is not in the open position).

Figure 6:
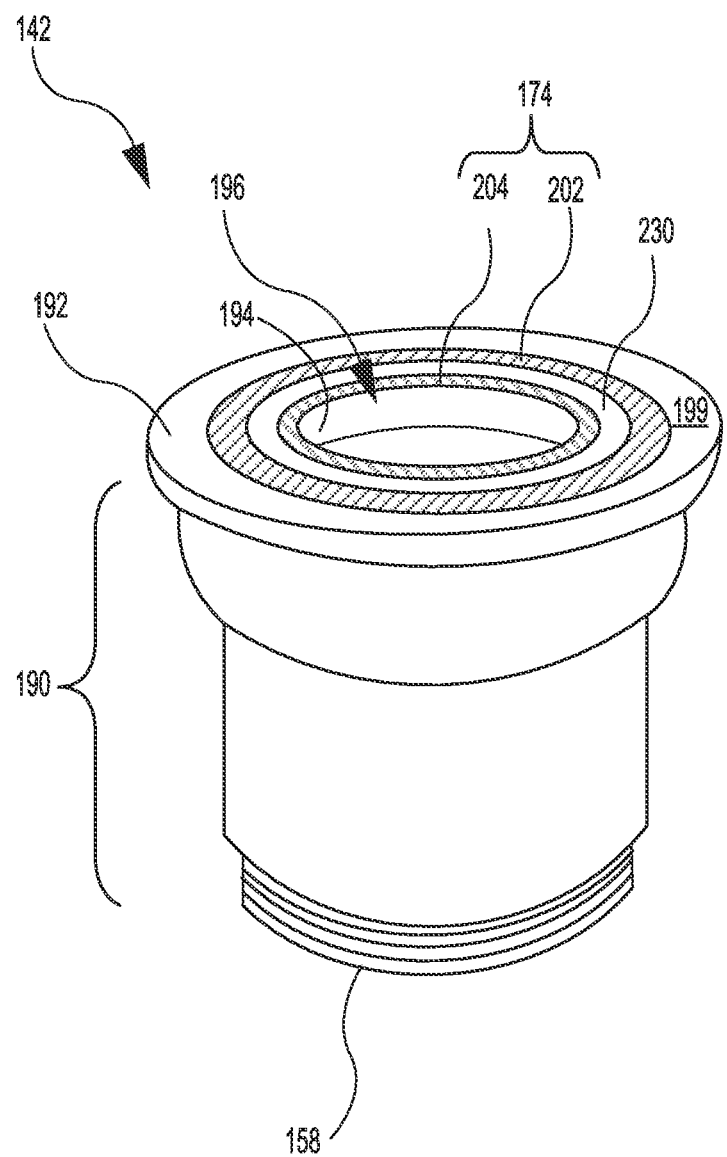
FIG. 6 illustrates a drain for an automatic drain system, in accordance with various embodiments.

With reference to FIG. 6, a drain 142 for an automatic drain system is illustrated. In various embodiments, automatic drain system 40 in FIGS. 3, 4A and 4B may include drain 142 in place of drain 42. Drain 142 includes a neck 190 and a flange 192. Neck 190 has a generally cylindrical shape and may be coaxial with a first conduit 50a (FIG. 3) connected to outlet 158 of drain 142. An internal (or inner circumferential) surface 194 of neck 190 defines the drain orifice 196 through which the liquid=enters drain 142. Flange 192 extends radially outward from neck 190. Flange 192 may extend 360° about neck 190. In various embodiments, flange 192 extends over at least a portion of surface 98 (FIG. 4A) of sink basin 34. In various embodiments, surface 199 of flange 92 is coplanar and/or even with surface 98 of sink basin 34.

In various embodiments, a liquid detection sensor 174 is formed on flange 192. Liquid detection sensor 174 includes a first conductor 202 and a second conductor 204. First conductor 202 and second conductor 204 are each made out of an electrically conductive material, for example, from a metal or a metal alloy. Second conductor 204 is electrically isolated from first conductor 202. In this regard, flange 192 of drain 142 may be made of an electrically isolating material and/or an electrically insulating material may be located between each of first and second conductors 202, 204 and flange 192. In various embodiments, first and second conductors may each have a generally annular or ring-like shape. Second conductor 204 may be located radially inward of first conductor 202 (e.g., between first conductor 202 and internal surface 194 of neck 190. In various embodiments, first conductor 202 and/or second conductor 204 may be located on internal surface 194 of neck 90 with first conductor 202 and/or second conductor 204 being located within reach of a person cleaning sink basin 34 (FIG. 4A).

First conductor 202 is electrically connected to positive terminal P+ in a manner similar to first conductor 102 in FIG. 4B. Second conductor 104 is electrically connected to negative terminal P− in a manner similar to first conductor 102 in FIG. 4B. First and second conductors 202, 204 are configured such that no current flows between first conductor 202 and second conductor 204 and/or between first portion 110 and second portion 114 of circuit 112, with momentary reference to FIG. 4B, unless a conductive liquid (e.g., water having dissolved ions) is in contact with both first conductor 202 and second conductor 204. Stated differently, current does not flow between first conductor 202 and second conductor 204 and/or between first portion 110 and second portion 114 of circuit 112 unless an electrical connected is formed between first conductor 202 and second conductor 204. In this regard, the presence of liquid in sink basin 34 creates a conductive link (e.g., an electrical connection) between first conductor 202 and second conductor 204 thereby causing current to flow from positive terminal P+ and first portion 110 of circuit 112 to negative terminal P− and second portion 114 of circuit 112.

In various embodiments, drain 142 includes an indicator light 230. Indicator light 230 may be located on flange 192 and may have a generally annular or ring-like shape. In various embodiments, indicator light 230 is located radially between first conductor 202 and second conductor 204. In various embodiments, indicator light 230 provides electrical isolation between first conductor 202 and second conductor 204. Controller 70 (FIG. 3) is in communication with and may control various functions of indicator light 230, as described about with reference to indicator light 130 in FIG. 3.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sink assembly, comprising:
    a sink basin;
    a drain located in a sink opening formed in the sink basin, the drain including a neck and a flange extending from the neck, wherein an internal surface of the neck defines a drain orifice; and
    a liquid detection sensor located on at least one of the neck or the flange, wherein the liquid detection sensor comprises:
        a first conductor electrically coupled to a positive terminal; and
        a second conductor electrically isolated from the first conductor and electrically coupled to a negative terminal.

2. The sink assembly of claim 1, a controller operably coupled to the liquid detection sensor, wherein the positive terminal is part of a first portion of a circuit located in the controller, and wherein the negative terminal is part of a second portion of the circuit, wherein the controller is configured to detect whether current is flowing through the circuit.

3. The sink assembly of claim 2, further comprising:
    a valve downstream of the drain; and
    an electromechanical actuator configured to translate the valve between an open position and closed position.

4. The sink assembly of claim 3, wherein the controller is configured to command the electromechanical actuator to actuate the valve to the open position in response to detecting current is flowing through the circuit, and wherein the controller is configured to command the electromechanical actuator to actuate the valve to the closed position in response to detecting current is not flowing through the circuit.

5. The sink assembly of claim 4, further comprising a faucet configured to output a liquid into the sink basin, wherein the controller is in communication with the faucet, wherein the controller is configured to determine a fault condition exists in response to determining that the faucet is outputting the liquid and that current is not flowing through the circuit.

6. The sink assembly of claim 1, wherein the drain includes at least one of a screen or a plug located between the flange and a distal end of the neck, and wherein the liquid detection sensor is located between the flange and the at least one of the screen or the plug.

7. The sink assembly of claim 1, wherein the liquid detection sensor is located on the neck and 6.0 inches or less from the flange.

\* \* \* \* \*